United States Patent
Furuya (10) Patent No.: US 6,628,936 B1
(45) Date of Patent: Sep. 30, 2003

(54) COMMUNICATION TERMINAL DEVICE

(75) Inventor: Mami Furuya, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/486,146

(22) PCT Filed: Jun. 23, 1999

(86) PCT No.: PCT/JP99/03337
§ 371 (c)(1),
(2), (4) Date: Jul. 26, 2000

(87) PCT Pub. No.: WO99/67959
PCT Pub. Date: Dec. 29, 1999

(30) Foreign Application Priority Data

Jun. 24, 1998 (JP) .......................................... P10-177684

(51) Int. Cl.[7] .............................................. H04M 11/10
(52) U.S. Cl. ................................ 455/412.1; 455/556.1; 455/466; 455/566; 340/7.52
(58) Field of Search ................................ 455/412, 403, 455/413, 566, 414, 556, 466; 340/7.51, 7.52, 7.55

(56) References Cited

U.S. PATENT DOCUMENTS 5,687,216 A * 11/1997 Svensson ...................... 379/58
6,044,275 A * 3/2000 Boltz .......................... 455/466
6,064,877 A * 5/2000 Yanagida ..................... 455/412

FOREIGN PATENT DOCUMENTS

| JP | 0316750 | 2/1991 | ............ H04B/7/26 |
| JP | 9224270 | 8/1997 | ............ H04Q/7/14 |
| JP | 10-136065 | 5/1998 | ............ H04M/1/00 |

* cited by examiner

Primary Examiner—William Trost
Assistant Examiner—Brandon J Miller
(74) Attorney, Agent, or Firm—Jay H. Maioli (57) ABSTRACT

A communication terminal device includes a reception unit for receiving a transmitted signal, a demodulation unit for demodulating the signal received by the reception unit, a storage unit for storing the data demodulated by the demodulation unit, a display unit on which data read from the storage unit is displayed, and a control unit for controlling operations of the storage unit and the display unit and for displaying an interruption display screen representing that data is deleted from the storage unit when new data from the demodulation unit is written in the storage unit.

22 Claims, 7 Drawing Sheets

```
PLEASE CALL ME !

```
MESSAGE HAS BEEN RECEIVED!

PLEASE PRESS ESCAPE BUTTON
```

FIG. 6C

```
1  GOOD MORNING...
2  HELLO...
3  03-1234-5678····
```

COMMUNICATION TERMINAL DEVICE

TECHNICAL FIELD

The present invention relates to a communication terminal device. In particular, the present invention relates to a communication terminal device having a storage unit for storing received data.

BACKGROUND ART

A terminal device (to be referred to as a pager device hereinafter) for causing a person who is outdoor or is moving to carry a message originated from a telephone from a general home or a public telephone. At present, the pager is a terminal device for receiving a message transmitted through a base station to receive a so-called one-direction communication service. The maximum number of received data which can be stored and accumulated in the memory of the pager device is predetermined depending on the storage capacity of the memory. Received data which are larger in number than that of the maximum number cannot be stored in the memory.

For this reason, in order to store new data in the memory when the number of data stored in the memory is maximum, the stored data which are equal in number than the data to be newly stored must be deleted regardless of the intentions of a user (to be referred to as a user hereinafter).

Conventionally, when message data, the number of which is the maximum number of storable data are stored in the memory, data to be deleted when new data is received is determined according to a predetermined priority order depending on conditions such as data which is not set in data delete prohibition (to be referred to as protect hereinafter) or data, reception time of which is oldest of those of the stored data.

Data to be deleted is automatically selected as described above, the selected data is automatically deleted from the memory, and new received data is memorized and stored.

In recent years, as a service using a pager device, a service for transmitting, in addition to messages outgoing from a general subscriber telephone, pieces of news transmitted at once from a communication center side to each pager device and message data for various types of information such as stock information is started. Therefore, the number of message data received by the pager devices tend to increase.

It is assumed that new data is received in a state in which data, the number of which is the maximum number of storable data are fully stored in the memory of the pager device, and that data selected as data to be automatically deleted of the plurality of data stored in the memory is deleted. In this case, in the pager device which displays a message related to the new data by an internal process without preferentially displaying the message, how to perform the process when the message of the data to be deleted is displayed on the display screen of the pager device is a problem.

As a countermeasure against the problem, the following may be considered. That is, the maximum value of one received data is regulated or set in advance, and a temporary storing memory for temporarily storing new received data is arranged independently of an original memory for storing the plurality of data. However, since some communication protocol permits a plurality of data to be simultaneously transmitted to the same address, this countermeasure must cope with the case in which a plurality of new data are simultaneously received. For this reason, a temporary storing memory having an enormous storage capacity which is a value obtained by multiplying the maximum number of data which are permitted to be simultaneously transmitted to the same address and the maximum number of addresses which can be set in the pager device to one maximum message data length must be arranged, or a storage area therefor must be assured.

As described above, the temporary storing memory for temporarily storing expected maximum new received data can be prepared. However, the temporary storing memory is prepared, a circuit scale increases, and the pager device itself increases in price.

Therefore, a pager device generally has a configuration in which a temporary storing memory is not arranged. When new data is received in a state in which data, the number of which is the maximum number of storable data, are stored, regardless of whether the message of data to be deleted is being displayed on the display screen, existing data must be immediately deleted from the memory in reception of the new data to write the new received data in the memory.

In such a case, for example, when data is read from a message memory, the order of deletion priority of which is the first, and is displayed, data, the order of deletion priority of which is the second, is automatically deleted. As a result, the data to be deleted are not selected from the memory according to the priority order to make a user confused.

When a new message is received in a state in which data related to a message, the order of deletion priority of which is the first, is displayed on the display unit of the pager device, the data displayed on the display unit is switched to a new received data message, and the process of automatically deleting the existing data from the memory is performed inside the pager device without performing a priority display of the data of the newly received message. In this case, how to process the data related to the message, the order of deletion priority of which is the first, is inconvenient on the screen display process or the operation.

Although the pager device has been described as an example, like the pager devices, some communication terminal device such as a mobile telephone device comprises a function of capable of receiving data of a message. When the data of the message is received by the communication terminal device, the same problems as described above are posed.

DISCLOSURE OF THE INVENTION

The present invention has been made in consideration of the above circumstances, and has as its object to perform a data deleting process by a preferable internal process in such a communication terminal device when new data is received.

In the first invention, a communication terminal device includes a reception unit for receiving a transmitted signal, a demodulation unit for demodulating the signal received by the reception unit, a storage unit for storing the data demodulated by the demodulation unit, a display unit on which data read from the storage unit is displayed, and a control unit for controlling operations of the storage unit and the display unit and for causing the display unit to display an interruption display screen representing that data is deleted from the storage unit when new data from the demodulation unit is written in the storage unit and when the new data is written after data stored in the storage unit is deleted. In this manner, the interruption display screen can preferably notify a user of the process of deleting existing data when new data is received.

In the second invention, in the communication terminal device according to the first invention, the control unit deletes data from the storage unit after the interruption display is performed on the display unit. In this manner, the data is delayed after the interruption display is performed, and the deleting process can be executed at a preferable timing.

In the third invention, in the communication terminal device according to the second invention, the control unit writes new data from the demodulation unit in the storage unit after the data of the storage unit is deleted. In this manner, writing of the new data in the storage unit can be preferably processed.

In the fourth invention, in the communication terminal device according to the second invention, data output from the demodulation unit, information representing the time and date at which the data is written in the storage unit, protect information representing whether deletion of the data is permitted or not, and attribute information including information representing whether the data has not been read or has been read are stored in the storage unit, and the control means automatically selects data to be deleted from the storage unit on the basis of the attribute information stored in the storage unit. In this manner, automatic selection of information to be deleted can be preferably performed on the basis of the information written in the storage unit.

In the fifth invention, in the communication terminal device according to the fourth invention, the control unit automatically selects, of the data stored in the storage unit, as data to be deleted from the storage unit, the data which is stored in the storage unit, which has an old time and date, and in which, of the pieces of attribute information of the data stored in the storage unit, the protect information represents that the data can be deleted, and the information representing whether the data has not been read or has been read represents that the data has been read. In this manner, deletion is enabled in the protect information, and the pieces of information which have been read are automatically deleted in the order of the times and dates of the pieces of information.

In the sixth invention, in the communication terminal device according to the first invention, the control unit checks whether, when the new data from the demodulation unit is written in the storage unit, the new data can be stored in the storage unit, the control unit performs the interruption display on the display unit when the check result determines that the new data cannot be written in the storage unit, and the control unit writes the new data in the storage unit without performing the interruption display on the display unit when the check result determines that the new data can be written in the storage. In this manner, only when new data cannot be written without deleting the data in the storage unit, the interruption display is performed.

In the seventh invention, in the communication terminal device according to the sixth invention, the control unit deletes data from the storing unit after the interruption display is performed on the display unit, and writes the new data from the demodulation unit in the storage unit after the data in the storage unit is deleted. In this manner, it is understood by the interruption display that the data remaining in the storage unit is deleted.

In the eighth invention, a communication terminal device includes a reception unit for receiving a transmitted signal, a demodulation unit for demodulating the signal received by the reception unit, a storage unit for storing the data demodulated by the demodulation unit, a display unit on which data read from the storage unit is displayed, and a control unit for controlling operations of the storage unit and the display unit and for causing the display unit to display an interruption display screen representing that data is deleted from the storage unit when new data from the demodulation unit is written in the storage unit and when data to be deleted of data stored in the storage unit is displayed. In this manner, when data to be displayed by receiving new data is displayed, the interruption display screen preferably notifies a user that the displayed data is deleted.

In the ninth invention, in the communication terminal device according to the eighth invention, the control unit deletes data from the storage after the interruption display is performed on the display unit. In this manner, the data is deleted after the interruption display, and a deleting process is executed at a preferable timing.

In the tenth invention, in the communication terminal device according to the ninth invention, the control unit writes new data from the demodulation unit in the storage unit after data in the storage unit is deleted. In this manner, writing of the new data in the storage unit can be preferably processed.

In the eleventh invention, in the communication terminal device according to the ninth invention, data output from the demodulation unit, information representing the time and date at which the data is written in the storage unit, protects information representing whether deletion of the data is permitted or not, and attribute information including information representing whether the data has not been read or has been read are stored in the storage unit, and the control means automatically selects data to be deleted from the storage unit on the basis of the attribute information stored in the storage unit. In this manner, automatic selection of information to be deleted can be preferably performed on the basis of the information written in the storage unit.

In the twelfth invention, in the communication terminal device according to the eleventh invention, the control unit automatically selects, of the data stored in the storage unit, as data to be deleted from the storage unit, the data which is stored in the storage unit, which has an old time and date, and in which, of the attribute information of the data stored in the storage unit, the protect information represents that the data can be deleted, and the information representing whether the data has not been read or has been read represents that the data has been read. In this manner, deletion is enabled in the protect information, and the pieces of information which have been read are automatically deleted in the order of the times and dates of the pieces of information.

In the thirteenth invention, in the communication terminal device according to the eighth invention, the control unit checks whether, when the new data from the demodulation unit is written in the storage unit, the new data can be stored in the storage unit, the control unit performs the interruption display on the display unit when the check result determines that the new data cannot be written in the storage unit, and the control unit writes the new data in the storage unit without performing the interruption display on the display unit when the check result determines that the new data can be written in the storage. In this manner, only when new data cannot be written without deleting the data in the storage unit, the interruption display is performed.

In the fourteenth invention, in the communication terminal device according to the thirteenth invention, the control unit deletes data from the storing unit after the interruption display is performed on the display unit, and writes the new data from the demodulation unit in the storage unit after the data in the storage unit is deleted. In this manner, it is understood by the interruption display that the data remaining in the storage unit is deleted.

In the fifteenth invention, a communication terminal device includes a reception unit for receiving a transmitted signal, a demodulation unit for demodulating the signal received by the reception unit, a storage unit for storing the data demodulated by the demodulation unit, a display unit on which data read from the storage unit is displayed, and a control unit for controlling operations of the storage unit and the display unit and for displaying an interruption display screen representing that data is deleted from the storage unit when new data from the demodulation unit is written in the storage unit. In this manner, notification to a user performed when new data is received is preferably performed by the interruption display screen.

In the sixteenth invention, in the communication terminal device according to the fifteenth invention, the control unit causes the display unit to display the interruption display screen when data displayed on the display unit of data stored in the storage unit is deleted from the storage unit. In this manner, the interruption display screen can preferably notify that the data is deleted.

In the seventeenth invention, in the communication terminal device according to the fifteenth invention, the control unit writes new data from the demodulation unit in the storage unit after the interruption display is performed on the display unit. In this manner, the data is deleted after the interruption display, and a deleting process is executed at a preferable timing.

In the eighteenth invention, in the communication terminal device according to the seventeenth invention, the control unit writes new data from the demodulation unit in the storage unit after data in the storage unit is deleted. In this manner, writing of the new data in the storage unit can be preferably processed.

In the nineteenth invention, in the communication terminal device according to the seventeenth invention, data output from the demodulation unit, information representing the time and date at which the data is written in the storage unit, protects information representing whether deletion of the data is permitted or not, and attribute information including information representing whether the data has not been read or has been read are stored in the storage unit, and the control means automatically selects data to be deleted from the storage unit on the basis of the attribute information stored in the storage unit. In this manner, automatic selection of information to be deleted can be preferably performed on the basis of the information written in the storage unit.

In the twentieth invention, in the communication terminal device according to the nineteenth invention, the control unit automatically selects, of the data stored in the storage unit, as data to be deleted from the storage unit, the data which is stored in the storage unit, which has an old time and date, and in which, of the attribute information of the data stored in the storage unit, the protect information represents that the data can be deleted, and the information representing whether the data has not been read or has been read represents that the data has been read. In this manner, deletion is enabled in the protect information, and the pieces of information which have been read are automatically deleted in the order of the times and dates of the pieces of information.

In the twenty-first invention, in the communication terminal device according to the fifteenth invention, the control unit checks whether, in order to write the new data from the demodulation unit in the storage unit, the new data can be stored in the storage unit, the control unit performs the interruption display on the display unit when the check result determines that the new data cannot be written in the storage unit, and the control unit writes the new data in the storage unit without performing the interruption display on the display unit when the check result determines that the new data can be written in the storage. In this manner, only when new data cannot be written without deleting the data in the storage unit, the interruption display is performed.

In the twenty-second invention, in the communication terminal device according to the twenty-first invention, the control unit deletes data from the storing unit after the interruption display is performed on the display unit, and writes the new data from the demodulation unit in the storage unit after the data in the storage unit is deleted. In this manner, it is understood by the interruption display that the data remaining in the storage unit is deleted.

BEST MODE FOR CARRYING OUT THE INVENTION

One embodiment of the present invention will be described below with reference to FIG. 1 to FIG. 8.

Figure 1:
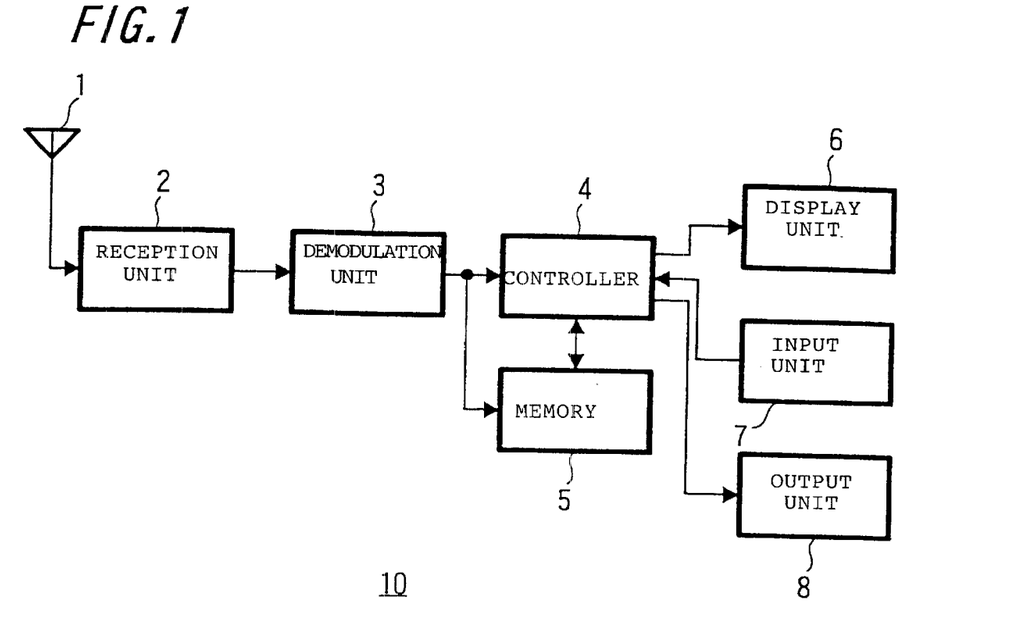
FIG. 1 is a block diagram showing an example of the configuration of a pager device according to one embodiment of the present invention.

A pager device serving as a mobile communication terminal device according to the present invention of this embodiment, for example, as shown in FIG. 1, receives a signal related to a message wireless-transmitted from, e.g., a base station through an antenna 1, and has a reception unit 2 to which the signal received by the antenna 1 is supplied and which receives the signal, a demodulation unit 3 for demodulating an output signal output from the reception unit 2, a controller 4 constituted by a microcomputer for controlling a pager device 10 according to the present invention as a whole, a memory 5 for storing data related to a predetermined number of messages and attribute information thereof, a display unit 6 for displaying data, time, and the like related to a desired message by an operation of a user or control of the controller 4, an input unit 7 for performing a predetermined operation such as a message display, selection of message ID data (ID data added to respective types of messages), setting of the attributes of the messages by the user, and an output unit 8 for outputting a predetermined alarm sound such as a buzzing sound in reception of, e.g., new data. The controller 4 controls writing of data demodulated by the demodulation unit 3 and reading of data from the memory 5 on the basis of the operation of a rotary encoder switch or an escape switch.

In this case, as attribute information stored in the memory 5, for example, unread/read information representing whether message data has been read or has not been read by a user, protect information representing whether protect for prohibiting deletion is set in the message data or not, and various pieces of information related to the message data such as information related to specific message ID data which attributes to the message data are considered. In this example, with respect to the number of message data which can set protect for prohibiting deletion of data, an upper limit is set for all the message data, or upper limits are set to the respective message data. The attribute information representing that the message data has been read by a user or not is switched to attribute information representing that the message has been displayed when a user selects unread message data from the memory 5 by using a rotary encoder switch or the like (to be described later) and when the message data is read from the memory 5 to display the contents of the message data on the display unit 6.

Figure 2:
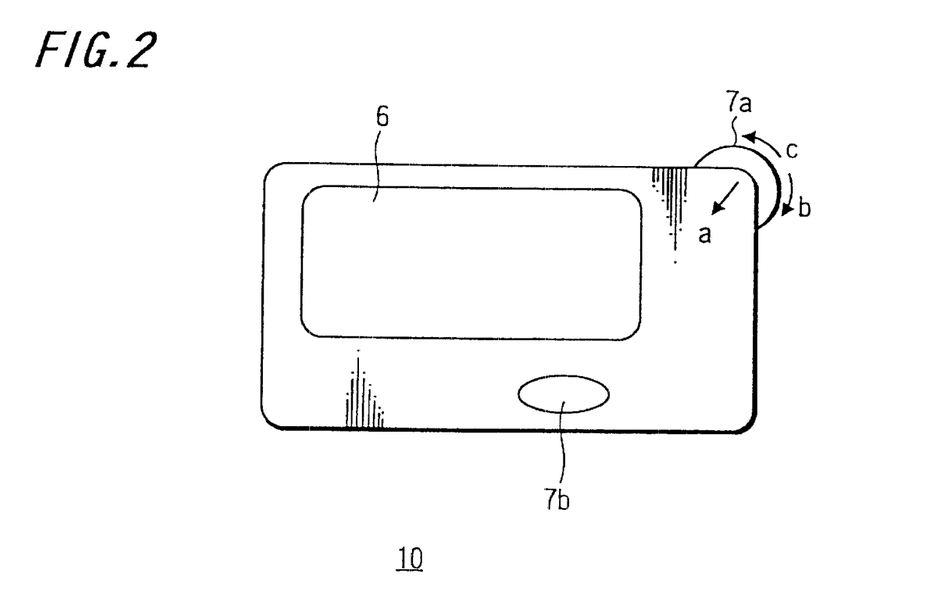
FIG. 2 is a plan view showing an example of the configuration of a pager device according to one embodiment of the present invention.

In the pager device 10 of this embodiment, for example, as shown in FIG. 2, the display unit 6 constituted by a liquid-crystal display element or the like is arranged at a position where the user of the main body of the pager device 10 can easily see the message, time, and the like of desired data. In this embodiment, in the pager device 10, as the input unit 7, a rotary encoder switch 7a for performing predetermined selection, determination, and the like by a pivoting operation and a pressing operation performed by the user, and an escape button 7b for stopping a process or an operation determined by the rotary encoder switch 7a are arranged. The rotary encoder switch 7a has an operation unit which can be pivotally operated by the user in directions indicated by arrows b and c in FIG. 2 and which can be subjected to a pressing operation in a direction of an arrow a, i.e., a direction in which the operation unit is sunk in the main body of the pager device 10a, and a switch which detects amounts of pivoting operations in the directions of the arrows b and c of the operation unit and which is operated when the encoder and the operation unit supplied to the controller 4 are pressed in the direction of the arrow a.

Figure 3:
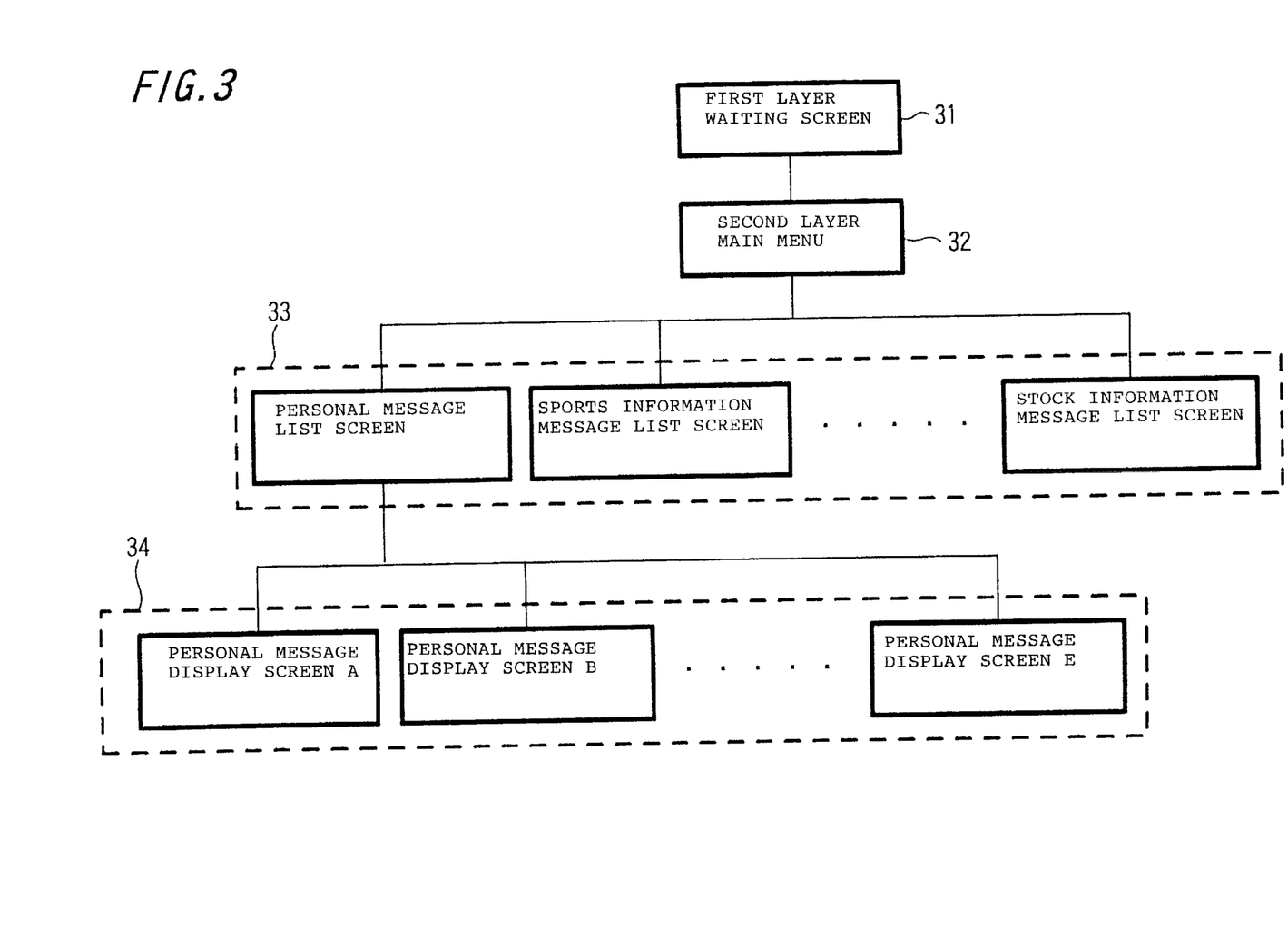
FIG. 3 is a diagram showing an example of a hierarchical structure of a screen display according to one embodiment of the present invention.

The hierarchical structure of the screen display of the pager device 10 according to this embodiment is a four-layer structure in this embodiment as shown in FIG. 3 for example. In this embodiment, the operation unit of the rotary encoder switch 7a is pressed downward by the controller 4 in the direction of the arrow a to switch a display on the display unit 6 to the screen display of the layer immediately below the present layer, and the escape button 7b is operated to switch a display on the display unit 6 to the layer immediately above the present layer. In this embodiment, the rotary encoder switch 7a is pivoted in one direction of the directions of the arrows b and c in FIG. 2 to shift a screen to another screen in the same layer, so that a screen desired by the user can be selected.

In the hierarchical structure of the screen displays of the display unit 6 shown in FIG. 3, a first layer 31 displays time or the like, and is a waiting screen in a reception waiting state of a signal transmitted from the base station. A second layer 32 is set as a main screen for selecting the addresses of a plurality of message ID data set in, e.g., the pager device 10. A third layer 33 is a screen showing a list of data of a plurality of messages stored in the message ID data selected by the second layer 32. In the third layer 33, message list screens of a plurality of set message ID data such as personal information or sports information are set, at least list screens, the number of which is equal to the number of message ID data which can be set, are set in the third layer 33. A fourth layer 34 is a message display screen on which all the texts of respective message data displayed on the list screens set in the third layer 33. In FIG. 3, only the fourth layer 34 related to message ID data which are personally set is shown. Here, as personally set message ID data, five message data are stored and accumulated.

In the memory 5 accumulated by the pager device of this embodiment, pieces of information such as message data are arranged and stored, the number of message data which can be stored is predetermined. In the following description, it is assumed that a maximum of 40 message data and pieces of attribute information thereof are can be stored in the memory 5 of the pager device 10, and it is assumed that 40 regions (to be referred to as handles hereinafter) for storing the pieces of attribute information. Each of the handles is set for one message data.

Figure 4:
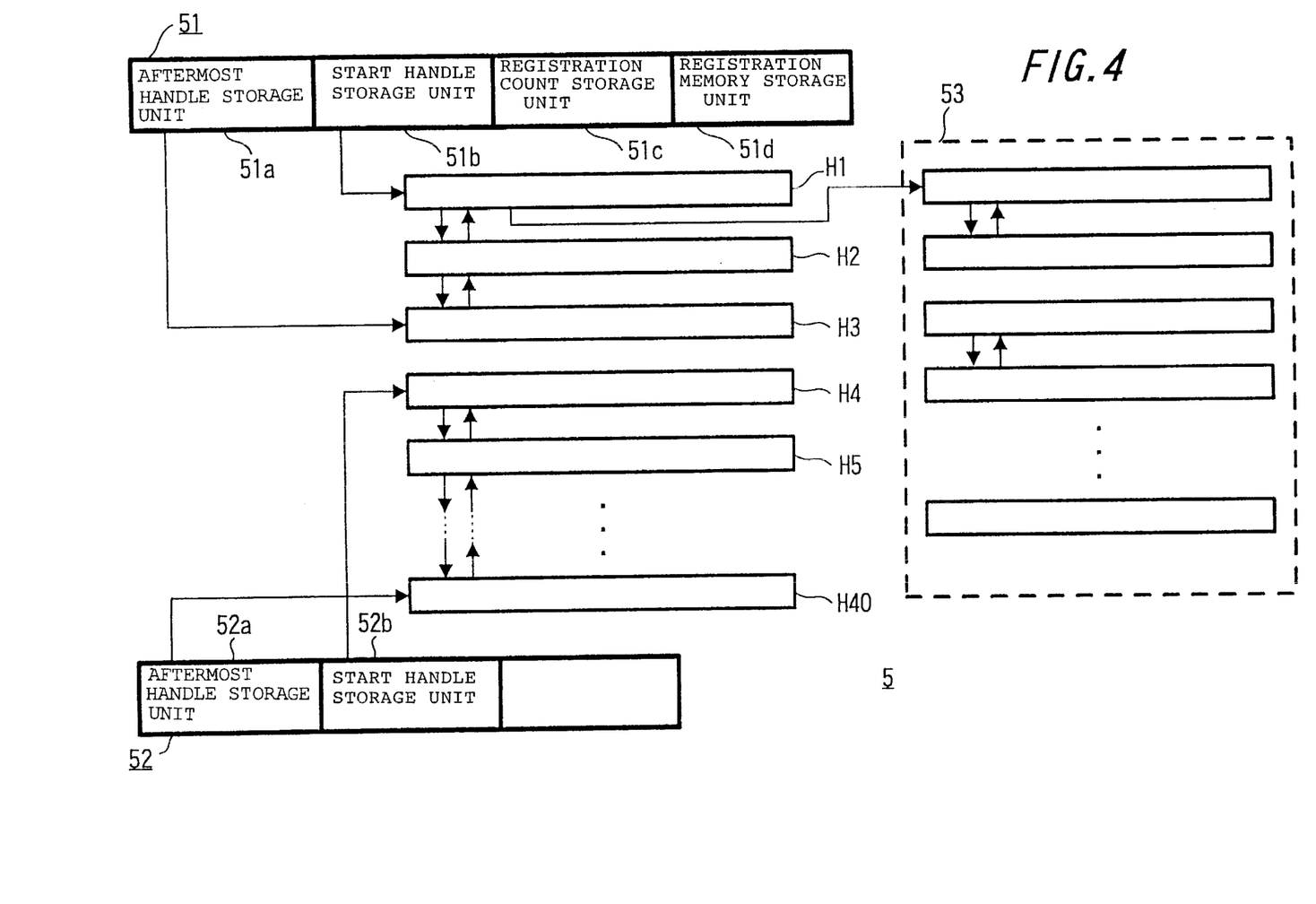
FIG. 4 is a diagram showing an example of the configuration of a memory according to one embodiment of the present invention.

Management of pieces of information such as message data in the memory 5 is as follows. For example, as shown in FIG. 4, in this embodiment, the management is performed on the basis of a message memory management table 51 for managing the handles in which pieces of attribute information related to the message data which are stored in advance and a empty handle management table 52 for managing unused handles (to be referred to as empty handles hereinafter) in which any attribute information is not stored. FIG. 4 shows a state in which three message data are stored. The pieces of attribute information of the message data are stored in handles H1 to H3, respectively.

The memory 5 has a message accumulation memory 53 for storing and accumulating message data. The message accumulation memory 53 is designed such that a predetermined amount of data can be stored as all a plurality of message data stored in the memory 53 without specifically determining a maximum capacity per message data. A storage capacity, of the message accumulation memory 53, in which data has been stored and which is used or consumed by storing one message data is dependent on the amount of message data to be accumulated. For this reason, depending on the amount of message data to be accumulated, 40 message data, the number of which is the maximum number of storable data of the memory 5, may not be stored. In this embodiment, pieces of attached information representing the ends of the message data are stored in the message accumulation memory 53.

One message data corresponds to each of the handles H1 to H3 in which the pieces of attribute information are stored, and corresponding message data are stored or accumulated in the handles H1 to H3, respectively. The handles H1 to H3 store pieces of attribute information related to various stored data such as information representing the start position of the message accumulation memory 53, information representing the presence/absence of a protect setting for prohibiting deletion of data, information representing whether the message of stored data has been read by a user or not, and information representing specific message ID data which attributes to the message of the stored data.

When a signal transmitted from a base station is received by the reception unit 2, and received data and data demodulated by the demodulation unit 3 are written in the memory 5, the information representing that data has been read or not is information representing that data has not been read. The attribute information representing that data has not been read is switched to information representing that data has been read when data is read from the memory 5 as described above and when the contents of message data is displayed on the display unit 6. The attribute information is not switched when message data is read from the memory 5 as shown in FIG. 6C (to be described later) and when only the tile of the message data is displayed. Thereafter, the attribute information is switched to attribute information representing that data has been read when the rotary encoder switch 7a is operated to develop and display the contents of the message data on the display unit 6.

The message memory management table 51, this embodiment, has an aftermost handle storage unit 51a for storing information representing the position of a handle (handle H3 in this case) in which attribute information related to, e.g., data (the newest data), which is lately received, of message data stored in the message accumulation memory 53 is accumulated, a start handle storage unit 51b for storing information representing the position of a handle (handle H1 in this case) in which attribute information related to, e.g., data (the oldest data) which is received at the first is accumulated, a registration count storage unit 51c for storing information representing a registration count of message data stored in the message accumulation memory 53 at present, and a registration memory storage unit 51d for storing information representing the storage capacity of a memory used the message data stored in the message storage memory. In this case, in the handles in which the pieces of attribute information, in this embodiment, in the handles including the start handle H1 to the aftermost handle H3, pieces of information representing the positions of front and rear handles are written, and the front and rear handles are linked to each other. The handles to be linked to each other are not always physically adjacent to each other.

When message data stored in the memory 5 must be automatically deleted, since the handles for managing the message data stored are linked to each other in this embodiment, as target data to be deleted from the memory 5 in this embodiment, a handle (handle H1 in this case) serving as the oldest data and stored in the start handle storage unit 5b is preferentially selected. For example, when protect information for prohibiting deletion of data is set as attribute information is set in the selected handle H1, or when information representing that a message has not been read is set, the next handle H2 linked to the handle H1 is selected. When protect information is also set in the handle H2 linked to the handle H1, or when information representing that a message has not been read is set, the next handle H3 linked to the handle H1 is sequentially selected. If protect for prohibiting deletion of data is not set in the handle H2 linked to the handle H1, and when information representing that a message has been read is set, the handle H2 is selected, and message data corresponding to the handle H2 is deleted. More specifically, in this embodiment, of message data stored in the memory 5, message data in which a protect setting for attribute information is not performed, which is information representing that the message data has been read, and which is the oldest message data of the message data stored in the memory 5 is preferentially selected as data to be deleted from the memory 5.

The empty handle management table 52 has an aftermost handle storage unit 52a for storing information representing the position of a handle which is set as an aftermost handle in, e.g., an initial setting or the position of a handle, which is lately set as an empty handle, of empty handles by a deleting operation of message data stored in, e.g., the memory 5, and a start handle storage unit 52b for storing position information of a handle, number of which is the smallest number of the number of the empty handles. As a handle, number of which is the smallest of the numbers of the empty handles stored in the start handle storage unit 52b, a handle, in which data has never been stored, of handles (the order of handle H1 to handle H40 in this embodiment) which are numbered for storage by, e.g., the initial setting, and which is set as an empty handle first of empty handles in which data is deleted by a deleting operation of, e.g., the stored message data described above after the handle having the smallest number or all the handles store data at least once is set. In this embodiment, the handle H40 is stored in the aftermost handle storage unit 52a, and the message data corresponding to the handle H3 has been stored in the start handle storage unit 52b. For this reason, the handle H4 is stored. In this case, in this embodiment, in the handles H4 to H40 of the start handle H4 to the aftermost handle H40, pieces of information representing the positions of the front and rear handles are written. These handles are linked to the front and rear handles. The handles to be linked to each other are not always physically adjacent to each other. Before message data is stored in the memory 5, in an initial state such as a factory shipment, all the handles H1 to H40 are empty handles. For this reason, all the handles H1 to H40 are managed by the empty handle management table 52.

Figure 5:
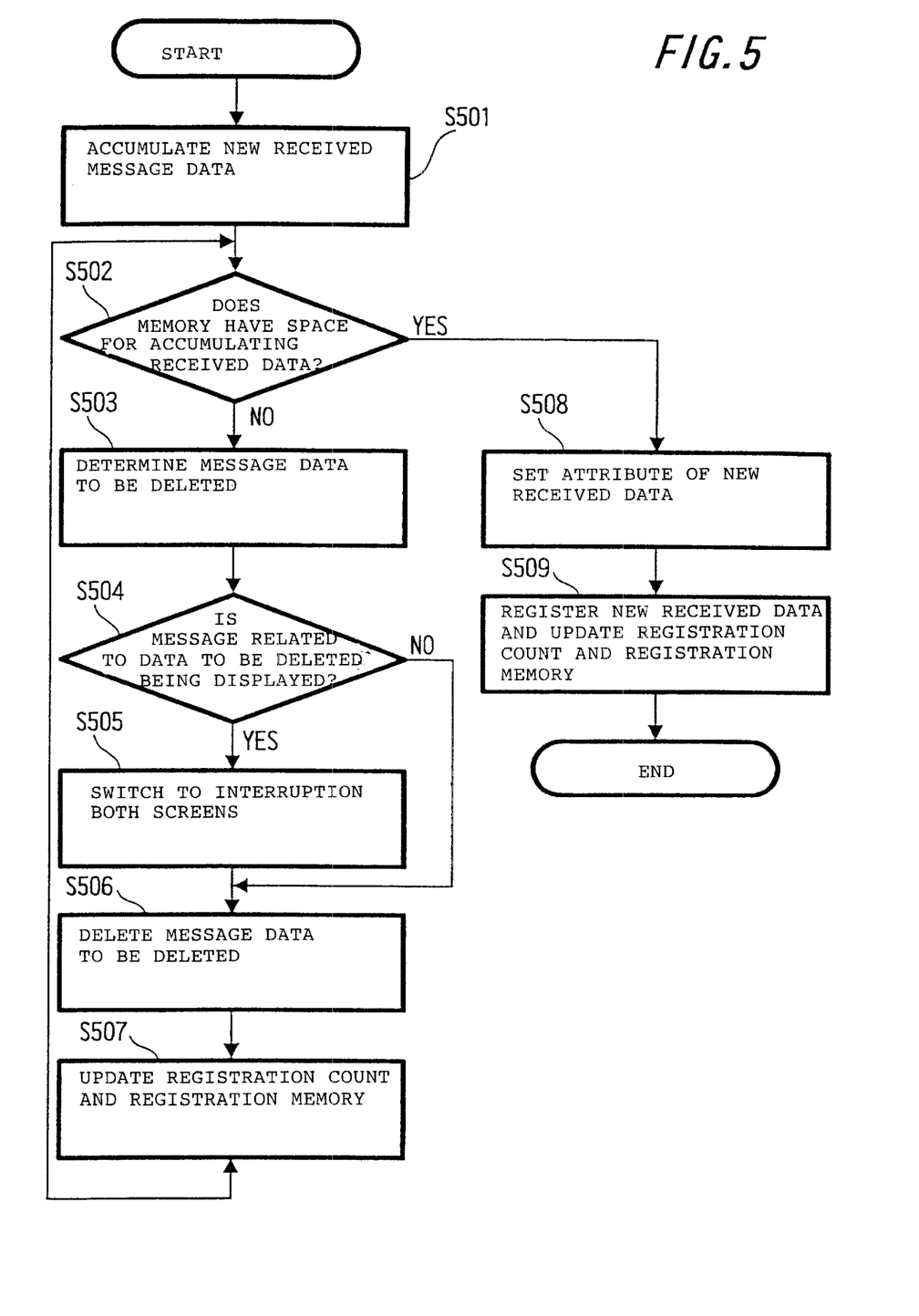
FIG. 5 is a flow chart showing an example of processes in reception of new data according to one embodiment of the present invention.

An operation performed when a signal, i.e., message data transmitted from a base station is received by the pager device 10 of this embodiment will be described below with reference to the flow chart in FIG. 5. When new message data transmitted from the base station is received, the controller 4 starts the process of writing the message data which is newly received and demodulated by the demodulation unit 3 in an empty region of the message accumulation memory 53 of the memory 5 in step S501.

When the controller 4 starts the process of accumulating new message data, in step S502, it is checked whether the memory 5 has a space for accumulating the newly received message data or not, i.e., a storage capacity in which message data can be stored, i.e., whether the number of message data reaches the maximum registration count which can be stored in the memory 5 and whether a region in which the newly received message data is stored can be assured. In this embodiment, the check in step S502 makes a check on the basis of a present registration count stored in the registration count storage unit 51c of the message memory management table 51 and a storage capacity used by message data stored in the registration memory storage unit 51d and the memory 53. In this case, in this embodiment, when the registration count stored in the registration count storage unit 51c is equal to the maximum number of storable data (40 in this embodiment), it is determined that newly received message data cannot be stored. If the registration count does not reach the maximum number of storable data, it is determined that newly received message data can be stored. In this embodiment, by writing message data in the message accumulation memory 53 stored in the registration memory storage unit 51d, on the basis of the capacity of the used memory, it is checked whether an unused region of the memory 53 has a space for newly writing and accumulating received message data. If it is that the new message data can be written and accumulated, it is determined that an accumulation region can be assured. If it is determined that the unused region of the memory 53 does not have a space for newly accumulating the newly received message data, it is determined that the accumulation region cannot be assured. In addition, when the data amount of the newly received message data is larger than the unused storage capacity of the memory 53, it is the newly received message data cannot be written and accumulated or that the accumulation region cannot be assured.

More specifically, in step S502, when the registration count stored in the registration count storage unit 51c is equal to the maximum number of storable data, or when a remaining storable unused storage capacity which remains for the storage capacity used by the message data stored in the registration memory storage unit 51d does not have a space for writing and accumulating the newly received message data, it is determined that the memory 5 does not have a space for storing the newly received message data or that data cannot be written in the memory 5.

If it is determined in step S502 that the memory 5 does not have a space for accumulating newly received message data, existing message data to be deleted is determined in step S503. When the existing message data to be deleted is determined, in this embodiment, message data, the order of deletion priority of which is high on the basis of attribute information stored in a handle, and which is the oldest of the message data stored in the memory 5 is selected as message data to be deleted. The priority order is determined depending on the presence/absence of a setting of protect information for prohibiting deletion of, e.g., data or depending on whether message data is the data of a message which has been read or the data of a message which has not been read. In this embodiment, a start handle which is a handle in which protect information for prohibiting deletion of data is not set and which has attribute information representing that a message has been read, and which is stored in the start handle storage unit 51b of the message memory management table 51, or a handle, the order of which is the earliest of the orders of handles linked from the start handle is selected. The message data corresponding to the selected handle is determined as message data to be deleted from the memory 5.

When the message data to be deleted is selected and determined in step S503, it is checked in step S504 whether the determined message data to be deleted is being displayed on the display unit 6.

Figure 6A:
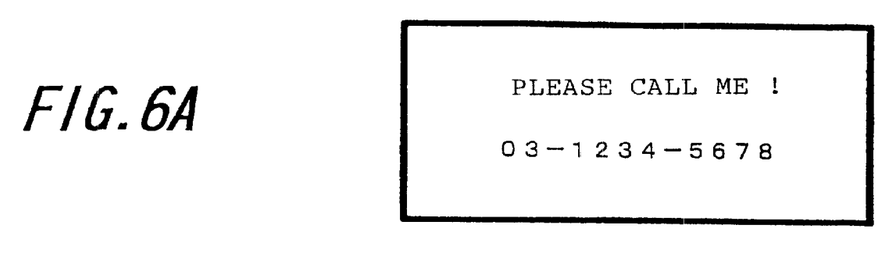
FIG. 6 is a diagram showing examples of interruption screen displays according to one embodiment of the present invention.
Figure 6B:
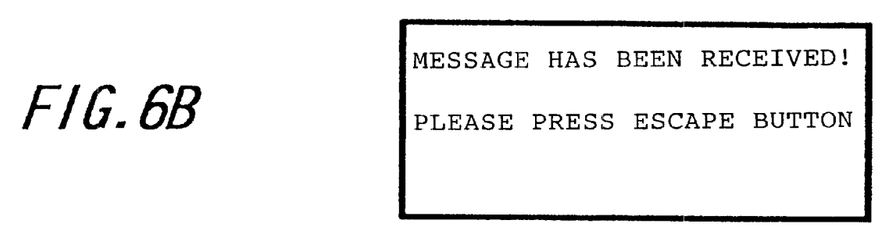
Figure 6C:
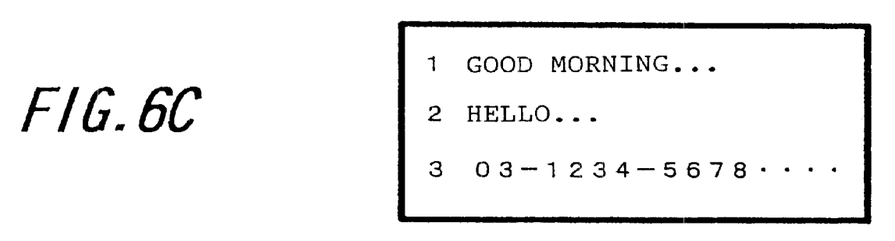

As a result of the check in step S504, for example, when message data is to be deleted is displayed as shown in FIG. 6, in this embodiment, in step S505, the display screen of the display unit 6 is switched from a screen on which the message data is to be deleted to an interruption screen. As this interruption screen, for example, as shown in B in FIG. 6, a notification screen, representing that the message data displayed on the display unit 6 at present is automatically deleted from the memory 5, for a user is displayed. In this embodiment, as shown in FIG. 6B, a display for urging a user to press the escape button 7b downward at the same time with notification of deletion of the on-display data is performed on the same notification screen as that on which the notification of deletion of the data is performed. When the user presses the escape button 7b downward according to the display of the notification screen, the display of the interruption screen of the display unit is ended. In this embodiment, even if the user does not press the escape button 7b downward, when the notification screen is interruption-displayed for a predetermined period of time, the interruption screen display of the display unit 6 automatically ends. In the example of the interruption screen shown in FIG. 6B, "message has been received!" is shown. However, "message has been received!, message data on display will be deleted!" may be displayed such that deletion is directly performed.

When the interruption screen display described above has ended, the display screen of the display unit 6 is switched to a predetermined screen display. In this case, in this embodiment, a screen display of a layer immediately above the layer of message data to be deleted displayed on the screen of the display unit 6 before the interruption screen is displayed. More specifically, when the message data to be deleted is displayed on the display unit 6, the state in which the message data is displayed on the display unit 6 is the state in which the display of the fourth layer 34 of the layer shown in FIG. 3 is performed. For this reason, the message list screen of the third layer 33 immediately above the fourth layer is displayed as shown in C of FIG. 6.

When the interruption screen display of the display unit 6 is ended to switch the display screen to the display screen of the layer immediately above the present layer as shown in FIG. 6C, or when it is determined in step S504 that a message is to be deleted and data are not displayed on the display unit 6, in step S506, and message data selected and determined as the object to be deleted is deleted from the message accumulation memory 53 of the memory 5. When deletion of the message data to be deleted from the memory 5 is executed, in step S507, one is subtracted from a registration count included in the message memory management table 51 and stored registration count storage unit 51c, and the storage capacity of the used memory stored in the registration memory storage unit 51d is arithmetically operated on the basis of the deleted message data to update the respective data.

At this time, the attribute information of the handle in which the attribute information of the deleted message data is stored is deleted.

When data of the registration count storage unit 51c and the data of the registration memory storage unit 51d are updated in step S507, the control flow returns to step S502 to check again whether the memory 5 has a space for accumulating newly received message data or not or whether the newly received message can be written in the memory 5 or not. For example, when there are two or more newly received data in the check in step S502, the memory 5 may not have a space for writing and accumulating the two or more newly received data yet. In this case, the operation started from step S503 is repeated in this embodiment, and a deleting operation of message data stored in the memory 5 is performed until all the newly received message data can be written and accumulated in the memory 5.

Figure 7:
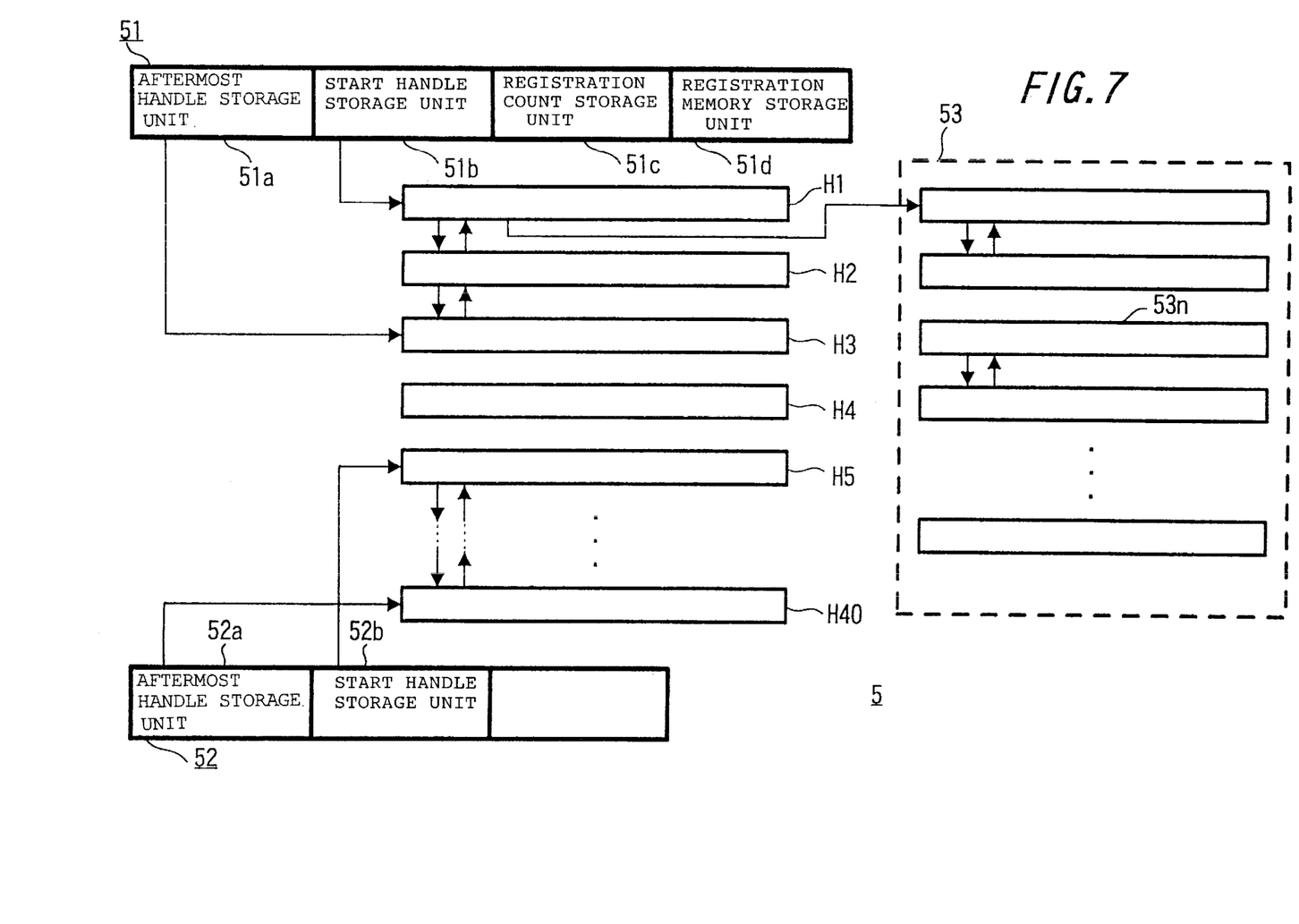
FIG. 7 is a diagram showing an example of the state of a memory from which a handle is separated according to one embodiment of the present invention.

When it is determined in step S502 that message data can be accumulated in the memory 5 or that the memory 5 has a space for accumulating the message data after deletion of one or two existing message data from the memory 5 is performed by the deleting operation in step S503 to step S507, or when it is determined in step S502 that, when message data is received, the memory 5 has a space for accumulating the received message data, the control flow shifts to step S508. More specifically, in step S502, when the registration count of the message data written which is written in the memory 5 of the registration count storage unit 51c is a count which does not reach the maximum number of storable data, when the unused region of the memory 5 has a space for accumulating new received message data on the basis of data related to the used storage capacity of the memory 5 stored in the registration memory storage unit 51$d$, in step S508, an initial setting for attribute information related to the message data newly received to a handle which is newly set to be an empty handle by the deleting operation of the data of the memory 5 described above or an empty handle determined according to the priority order is performed. An operation for this initial setting is performed as follows. That is, as shown in FIG. 7, the empty handle H4 stored in the start handle storage unit 52$b$ of the empty handle management table 52 is separated, and, for the handle H4 which is not managed by either one of the management tables 51 and 52 and which is not linked to any handles, attribute information related to the newly received message data accumulated in a predetermined storage region 53$n$ of the message accumulation memory 53 is performed. The initial setting of the attribute information is performed such that, for example, reception time information of message data, message ID data, information which representing that a message has not been read, and the like are set.

Figure 8:
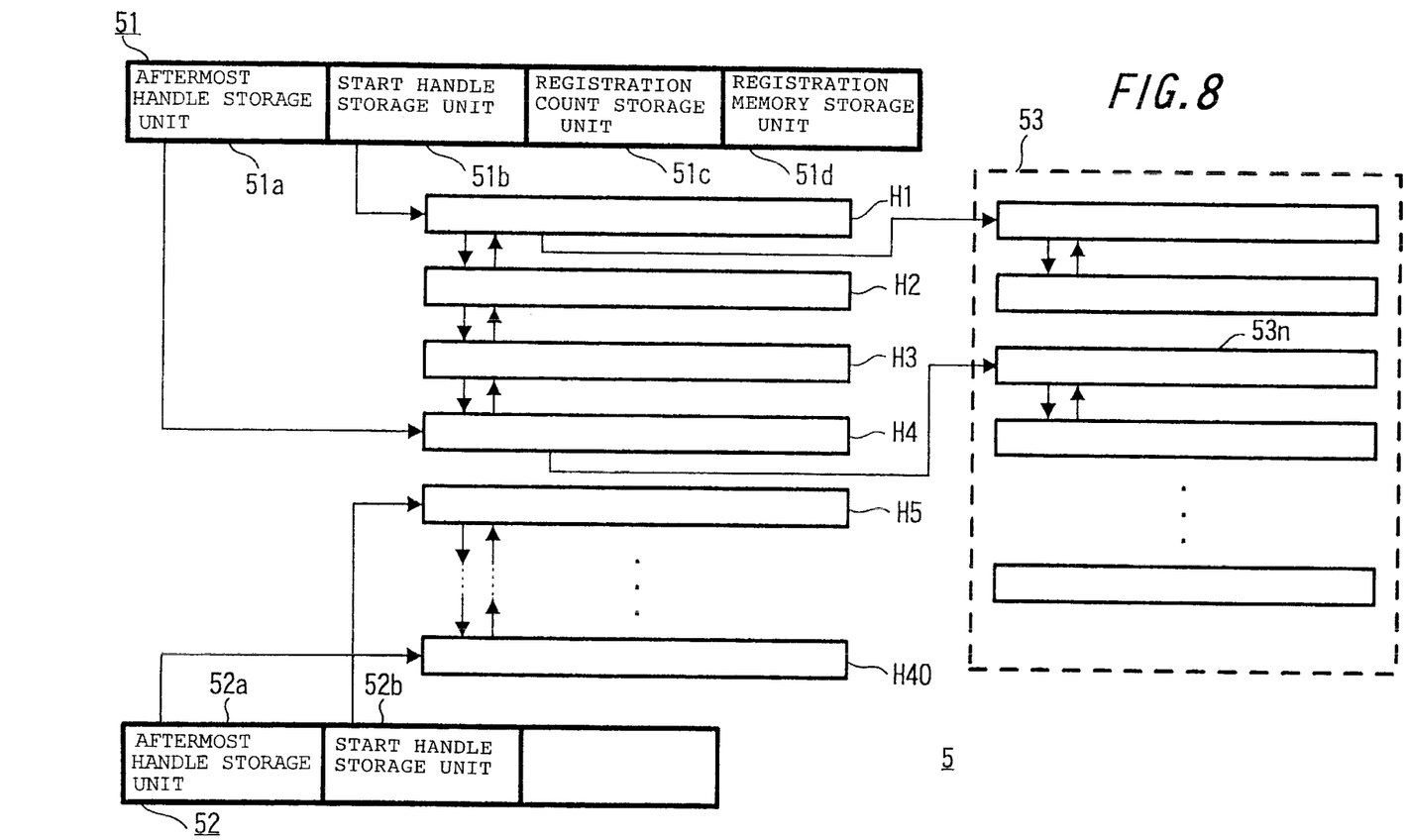
FIG. 8 is a diagram showing an example of the state of a memory on which new data is registered according to the present invention.

When the initial setting of attribute information is performed for the empty handle H4, in step S509, a registration process of newly received message data is performed. In this registration process, for example, as shown in FIG. 8, data representing, e.g., the start of the message accumulation memory 53 in which the newly received message data is written is stored in the empty handle H4, and the empty handle H4 is linked to the storage region 53$n$ of the message accumulation memory 53 in which the newly received message data is written. In this embodiment, the position of the handle H4 to be newly registered, e.g., the address data of the handle H4 is stored in the aftermost handle storage unit 51$a$ of the message memory management table 51, the data of the registration count of the registration count storage unit 51$c$ and the data of the used storage capacity of the memory 5 of the registration memory storage unit 51$d$ are updated. In this case, the handle H4 to be newly registered is linked to the handle H3 which has been stored in the aftermost handle storage unit 51$a$ before the handle H4 is registered.

With the above configuration, according to the present invention, without assuring another enormous memory in which received data is temporarily stored in a pager device, a newly received registration process can be performed such that an ordinary memory for registering message data is diverted. Received message data management by limited memories can be performed.

With the configuration described above, according to the present invention, when existing data must be automatically deleted by receiving new message data, even if message data to be deleted is displayed on the display unit, message data can be automatically deleted in a desired order without disturbing a priority order of predetermined message data to be deleted of a plurality of message data stored in the memory. Message data can be avoided from being unexpectedly eliminated by an irregular order of automatic deletion of the message data from the memory.

With the configuration described above, according to the present invention, when on-display message data is automatically deleted from the memory, an appropriate and preferable screen display can be performed, it can be easily understood by a user that the on-display message data is automatically deleted by an internal process of the pager device and that new message data is received. For this reason, the usability of the pager device can be improved without confusing the user.

In one embodiment described above, a screen is switched to an interruption screen when message data to be deleted is being displayed on the display unit. However, when message data is automatically deleted from the memory, the screen may be always switched to the interruption screen regardless of the on-display message. In this case, for example, a notification representing that one of stored message data is deleted may be displayed as the interruption screen. In this manner, a preferable data deleting process and an appropriate screen display can be performed without checking whether message data to be deleted is being displayed on the screen or not.

In one embodiment described above, when all the messages of the fourth layer are displayed on the display unit, and when the displayed message data becomes message data to be deleted, the display of the display unit is switched to an interruption screen. However, while a list of messages belonging to predetermined message ID data of the third layer is being displayed, when message data belonging to the message ID data is to be deleted, the display screen of the display unit may be switched to the interruption screen. In this case, for example, a notification representing any message data belonging to message ID data related to a list displayed on the display unit at present is deleted is displayed as the interruption screen. Upon completion of the interruption screen, e.g., the screen of the second layer is displayed on the display unit. In this manner, even if part of the message data to be deleted is being displayed as a list of message data, a preferable deleting process and a preferable screen display can be performed.

In addition, in one embodiment described above, the maximum number of storable message data is set to be 40, and the number of handles is set to be 40. However, these numbers are not limited to the values.

Furthermore, in one embodiment described above, as a communication terminal device, a pager device serving as a portable communication terminal device for receiving message data is applied. However, the present invention can also be applied to not only another wireless communication terminal device for receiving similar message data, but also to a cable communication terminal device which receives data or a signal through a connection cable or the like.

What is claimed is:

1. A communication terminal device comprising:
a reception unit for receiving a transmitted signal;
a demodulation unit for demodulating the transmitted signal received by the reception unit;
a storage unit for storing a predetermined number of data demodulated by the demodulation unit and a predetermined capacity of data demodulated by the demodulation unit;
a display unit having a screen on which the data read from the storage unit is displayed; and
a control unit for controlling operations of the storage unit and the display unit and for causing the display unit to display an interruption display as a predetermined picture on the screen representing that data is deleted from the storage unit when the storage unit receives from the demodulation unit new data in excess of the predetermined number of data and the predetermined capacity of data and is written with data after the already stored data in the storage unit is deleted according to predetermined priority data.

2. The communication terminal device according to claim 1, wherein the control unit deletes the data from the storage unit after the interruption display is performed on the display unit.

3. The communication terminal device according to claim 2, wherein the control unit writes the new data from the demodulation unit in the storage unit after the data of the storage unit is deleted.

4. The communication terminal device according to claim 2, wherein data output from the demodulation unit, information representing a time and a date at which the data is written in the storage unit, protect information representing whether deletion of the data is permitted, and attribute information including information representing whether the data has been read are stored in the storage unit, and the control unit automatically selects the data to be deleted from the storage unit on the basis of the attribute information stored in the storage unit.

5. The communication terminal device according to claim 4, wherein the control unit automatically selects the data stored in the storage unit as data to be deleted from the storage unit, which has an old time and date, and from the pieces of the attribute information of the data stored in the storage unit, the protect information represents whether the data can be deleted, and the protect information represents whether the data has been read.

6. The communication terminal device according to claim 1, wherein the control unit checks whether the new data from the demodulation unit can be stored in the storage unit once in the storage unit, whether the control unit performs the interruption display on the display unit when the check result determines that the new data cannot be written in the storage unit, and whether the control unit writes the new data in the storage unit without performing the interruption display on the display unit when the check result determines that the new data can be written in the storage.

7. The communication terminal device according to claim 6, wherein the control unit deletes data from the storing unit after the interruption display is performed on the display unit, and writes the new data from the demodulation unit in the storage unit after the data in the storage unit is deleted.

8. A communication terminal device comprising:

a reception unit for receiving a transmitted signal;

a demodulation unit for demodulating the transmitted signal received by the reception unit;

a storage unit for storing a predetermined number of data demodulated by the demodulation unit and a predetermined capacity of data demodulated by the demodulation unit;

a display unit having a screen on which data read from the storage unit is displayed; and a control unit for controlling operations of the storage unit and the display unit and for causing the display unit to display an interruption display as a predetermined picture on the screen representing that data is deleted from the storage unit when the storage unit receives from the demodulation unit new data in excess of the predetermined number of data and the predetermined capacity of data and is written with data after the data that belongs to the already stored data in the storage unit and is displayed on the screen is deleted according to predetermined priority data.

9. The communication terminal device according to claim 8, wherein the control unit deletes the data from the storage unit after the interruption display is performed on the display unit.

10. The communication terminal device according to claim 9, wherein the control unit writes the new data from the demodulation unit in the storage unit after the data in the storage unit is deleted.

11. The communication terminal device according to claim 9, wherein data output from the demodulation unit, information representing a time and a date at which the data is written in the storage unit, protect information representing whether deletion of the data is permitted, and attribute information including information representing whether the data has been read are stored in the storage unit, and the control unit automatically selects the data to be deleted from the storage unit on the basis of the attribute information stored in the storage unit.

12. The communication terminal device according to claim 11, wherein the control unit automatically selects the data stored in the storage unit as data to be deleted from the storage unit which has an old time and date, and from the attribute information of the data stored in the storage unit, the protect information represents whether the data can be deleted, and the protect information represents whether the data has been read.

13. The communication terminal device according to claim 8, wherein the control unit checks whether the new data from the demodulation unit can be stored in the storage unit once written in the storage unit, whether the control unit performs the interruption display on the display unit when the check result determines that the new data cannot be written in the storage unit, and whether the control unit writes the new data in the storage unit without performing the interruption display on the display unit when the check result determines that the new data can be written in the storage unit.

14. The communication terminal device according to claim 13, wherein the control unit deletes the data from the storing unit after the interruption display is performed on the display unit, and writes the new data from the demodulation unit in the storage unit after the data in the storage unit is deleted.

15. A communication terminal device comprising:

a reception unit for receiving a transmitted signal;

a demodulation unit for demodulating the transmitted signal received by the reception unit;

a storage unit for storing a predetermined number of data demodulated by the demodulation unit and a predetermined capacity of data demodulated by the demodulation unit;

a display unit having a screen on which the data read from the storage unit is displayed; and a control unit for controlling operations of the storage unit and the display unit and for displaying an interruption display on the screen as a predetermined picture representing that data is deleted from the storage unit when the storage unit receives from the demodulation unit new data that is written therein.

16. The communication terminal device according to claim 15, wherein the control unit causes the display unit to display the interruption display screen when the data displayed on the display unit of the data stored in the storage unit is deleted from the storage unit.

17. The communication terminal device according to claim 15, wherein the control unit writes the new data from the demodulation unit in the storage unit after the interruption display is performed on the display unit.

18. The communication terminal device according to claim 17, wherein the control unit writes the new data from the demodulation unit in the storage unit after the data in the storage unit is deleted.

19. The communication terminal device according to claim 17, wherein the data output from the demodulation unit, information representing a time and a date at which the data is written in the storage unit, the protect information representing whether deletion of the data is permitted, and attribute information including information representing whether the data has been read are stored in the storage unit, and the control unit automatically selects the data to be deleted from the storage unit on the basis of the attribute information stored in the storage unit.

20. The communication terminal device according to claim 19, wherein the control unit automatically selects the data stored in the storage unit as data to be deleted from the storage unit which has an old time and date, from the attribute information of the data stored in the storage unit, the protect information represents whether the data can be deleted, and the protect information represents whether the data has been read.

21. The communication terminal device according to claim 15, wherein the control unit checks whether, in order to write the new data from the demodulation unit in the storage unit, the new data can be stored in the storage unit, whether the control unit performs the interruption display on the display unit when the check result determines that the new data cannot be written in the storage unit, and whether the control unit writes the new data in the storage unit without performing the interruption display on the display unit when the check result determines that the new data can be written in the storage.

22. The communication terminal device according to claim 21, wherein the control unit deletes data from the storing unit after the interruption display is performed on the display unit, and writes the new data from the demodulation unit in the storage unit after the data in the storage unit is deleted.

* * * * *